W. J. WILLIAMS.
METAL WORKING ROLLS.
APPLICATION FILED MAY 22, 1908.
921,042.
Patented May 11, 1909.
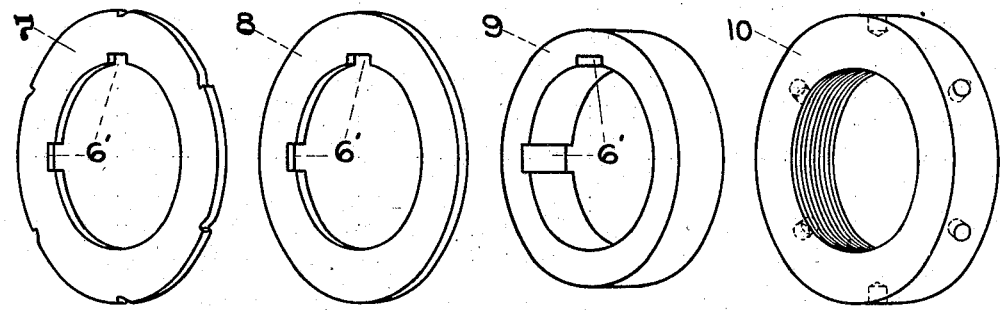
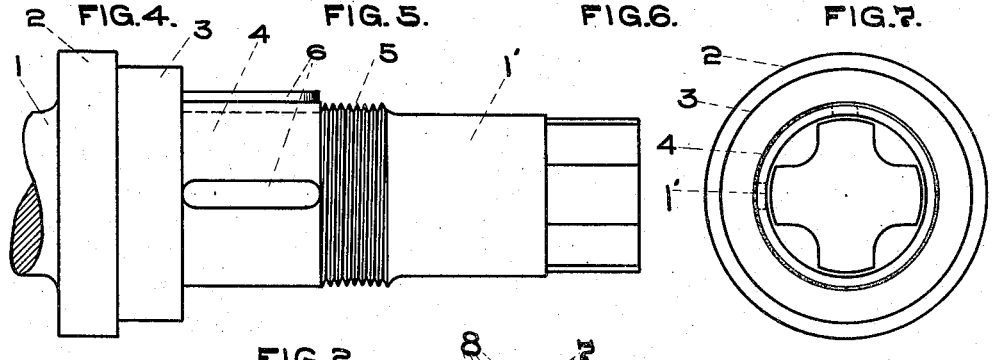
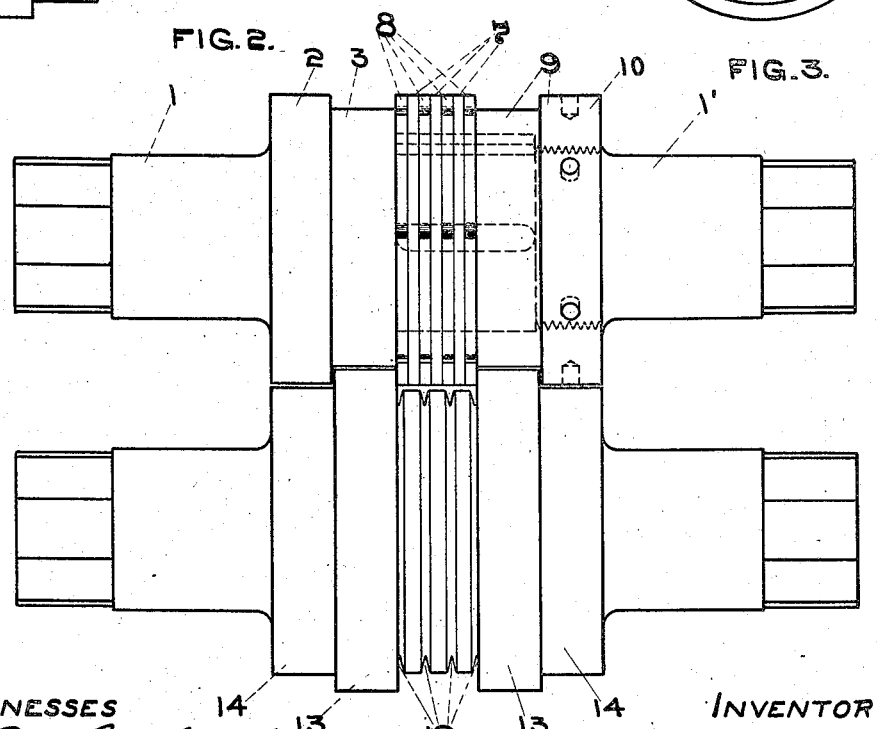

UNITED STATES PATENT OFFICE.

WILLIAM J. WILLIAMS, OF FRANKLIN, PENNSYLVANIA.

METAL-WORKING ROLLS.

No. 921,042.      Specification of Letters Patent.      Patented May 11, 1909.

Application filed May 22, 1908. Serial No. 434,334.

*To all whom it may concern:*

Be it known that I, WILLIAM J. WILLIAMS, citizen of the United States, residing at Franklin, in the county of Venango and State of Pennsylvania, have invented certain new and useful Improvements in Metal-Working Rolls, of which the following is a specification, reference being had therein to the accompanying drawings.

The construction of my improved rolls is herein fully set forth, reference being had to the accompanying drawings which form a part hereof and in which, Figure 1 is an elevation of my improved rolls. Fig. 2 is an elevation of the body or arbor of the upper roll stripped of its rings, collar and nut. Fig. 3 is an end elevation of Fig. 2. Fig. 4 is a perspective view of one of the notched rings which I employ in constructing one of my rolls. Fig. 5 is a perspective view of one of the plain rings which I employ in constructing one of my rolls. Fig. 6 is a collar. Fig. 7 is a nut.

The object of my invention is to provide an easily and cheaply constructed set of rolls especially for the production of a tie-plate bar, such as is shown in an application for Letters Patent for an improved process of rolling tie-plate bars, which application is executed and filed at even date herewith and numbered Serial No. 434,336. Said rolls may be easily adapted to rolling other shapes.

The construction of my improved rolls is as follows: In constructing the upper roll, I provide a body or arbor—Fig. 2—which has the usual form of bearings 1 and 1', at either end thereof; approximate to the bearing 1, I form a collar consisting of the steps 2, 3, and adjacent to the step 3 is an arbor 4, the office of which will be hereafter specified. Adjacent to the arbor is a threaded section 5, and adjacent to this is the bearing 1'. Arbor 4 is provided with suitable keys 6. Upon said arbor I alternately mount rings 7—Fig. 4, and rings 8,—Fig. 5; said ring 7 has equally spaced notches formed in its periphery, which notches are for the obvious purpose of forming studs upon the face of the tie-plate-bar.

After the desired number and combination of rings have been located upon arbor 4, collar 9—Fig. 6—is placed upon the arbor. Said collar as well as rings 7 and 8 are provided with key-seats 6' for the reception of the keys 6. Collar 9, when in position, corresponds to the step 3 at the other side of said rings. For the purpose of securing the rings and collar in position, I employ a nut 10—Fig. 7—which occupies the screw-threaded portion 5 of the body. The roll thus completed is shown in Fig. 1.

I do not, however, wish to be understood as limiting myself to the particular number and combination of rings shown in Fig. 1, as the plain and notched rings could be easily transposed, or one notched ring and several plain ones could be used, and still be within the spirit and scope of my invention. In the event of any change in the number and location of rings 7 and 8, the bar-groove in the lower roll would be correspondingly modified.

The construction of the lower roll is substantially as follows: The essential feature of the same is a comparatively deep bar-groove 11 in the bottom of which is formed a number of flange-grooves 12, which grooves 12 preferably correspond in number and vertical alinement with the notched rings 7. At each side of said bar-groove are formed collars composed of steps 13, 14, outside of which, may be located bearings of the usual construction.

By the construction above set forth, it will be noted that the rings 7 and 8 of the upper roll unitedly form a tongue, which occupies a portion of the bar-groove in the lower roll, thus forming a closed pass by which the tie-plate-bar, or other article, is caused to have a true, square, and clean cut shape, particularly along the edges and at the corners.

My rolls are easy to construct and also easy to keep in repair, and the rings, which make up the wearing parts of the upper roll, may be very cheaply, quickly, and easily replaced.

I claim:

1. Metal working rolls consisting of a roll having a body portion, provided with integrally formed flanges forming between them a peripheral groove, combined with a second roll having a removable sectional tongue adapted to operate in said groove, and substantially the same width as the groove to form a closed pass, substantially as shown and described.

2. Metal working rolls consisting of a roll having a body portion provided with integrally formed flanges, forming between them a peripheral groove, combined with a second roll having a removable sectional tongue adapted to operate in said groove, and of substantially the same width as the groove to form a closed pass, the lateral faces of the said tongue and the adjacent faces of said flanges being substantially perpendicular with the axes of said rolls.

3. Metal-working rolls consisting of a roll having a bar-groove therein, the peripheral face of said groove being suitably conformed and the lateral faces of said groove being substantially perpendicular to the axis of said roll, said bar groove being formed by integrally formed flanges on the rolls, in combination with a roll having a tongue of substantially the same width as the bar groove and composed of a plurality of removable rings, the peripheries of a portion of said rings being plain and a portion thereof being otherwise conformed, the lateral faces of said tongue being substantially perpendicular to the axis of said roll, and means for non-revolubly securing said rings in position.

4. Metal working rolls, comprising a roll having integrally formed flanges to provide a peripheral groove, a second roll having a sectional removable tongue to coöperate with said groove and of a width substantially the same as that of the groove to form a closed bar pass, said second roll also having end flanges to provide grooves between the same and the tongue to receive the flanges of the first roll, substantially as shown and described.

In testimony whereof I affix my signature in presence of two witnesses.

WILLIAM J. WILLIAMS.

Witnesses:
E. R. INMAN,
V. E. LOVELAND.